United States Patent [19]

Blakeley et al.

[11] Patent Number: 5,314,309

[45] Date of Patent: May 24, 1994

[54] TURBINE BLADE WITH METALLIC ATTACHMENT AND METHOD OF MAKING THE SAME

[76] Inventors: Anthony Blakeley, 4116 Florida Dr., Rockford, Ill. 61108; Gregory E. Horihan, 3358 Tannenbaum La., Rockford, Ill. 61109; Timothy S. Konicek, 138 Flintridge, Apt. 5, Rockford, Ill. 61107; Patrick J. O'Callaghan, 4825 Sovereigh Blvd., Rockford, Ill. 61108; Martin W. Carrington, 5061 Linden Rd., Apt. 5101, Rockford, Ill. 61109; Jeffrey A. Brown, 2224 Colorado Ave., Rockford, Ill. 61108

[21] Appl. No.: 804,391
[22] Filed: Dec. 10, 1991

Related U.S. Application Data

[63] Continuation of Ser. No. 528,479, May 25, 1990, abandoned.
[51] Int. Cl.$^5$ .................. F01D 5/14; B32B 17/04
[52] U.S. Cl. ................ 416/226; 416/230; 416/241 A; 29/889.71; 264/135; 264/258
[58] Field of Search ........ 416/230 A, 230 R, 226, 416/239, 241 A, 241 R, 202, 241 B; 29/888.025, 889.21, 889.71, 527.2; 264/258, 135

[56] References Cited

U.S. PATENT DOCUMENTS

| | | | |
|---|---|---|---|
| 2,511,862 | 6/1950 | Martin | 416/226 |
| 3,303,889 | 2/1967 | Bates | 416/239 |
| 3,368,795 | 2/1968 | Bolin et al. | 416/241 A |
| 3,756,746 | 9/1973 | Baker | 416/241 A |
| 3,782,856 | 1/1974 | Salkind et al. | 416/226 |
| 3,923,421 | 12/1975 | Carter et al. | 416/241 A |
| 3,950,115 | 4/1976 | Euler | 416/226 |
| 4,060,413 | 11/1977 | Mazzei et al. | 416/241 A |
| 4,278,401 | 7/1981 | Martinelli | 416/241 A |
| 4,295,907 | 10/1981 | Cordts et al. | 264/135 X |
| 4,470,862 | 7/1984 | More et al. | 416/226 X |
| 4,621,980 | 11/1986 | Reavely et al. | 416/226 |
| 4,648,921 | 3/1987 | Nutter, Jr. | 416/226 X |
| 4,720,244 | 1/1988 | Kluppel et al. | 416/241 B |
| 4,810,167 | 3/1989 | Spoltzman et al. | 416/230 X |
| 4,815,940 | 3/1989 | LeShane et al. | 416/241 A |
| 4,832,990 | 5/1989 | Boccalon et al. | 264/135 X |
| 4,834,616 | 5/1989 | Kasarsky et al. | 416/239 X |
| 4,937,032 | 6/1990 | Krone et al. | 264/258 X |
| 4,973,521 | 11/1990 | Graff et al. | 416/230 X |
| 4,990,205 | 2/1991 | Barbier et al. | 416/241 A X |
| 5,021,289 | 6/1991 | Light et al. | 264/258 X |
| 5,039,470 | 8/1991 | Bezin et al. | 264/258 X |
| 5,076,760 | 12/1991 | Weetman et al. | 416/241 A |
| 5,118,257 | 6/1992 | Blakely et al. | 416/226 X |

FOREIGN PATENT DOCUMENTS

| | | | |
|---|---|---|---|
| 3125315 | 5/1988 | Japan | 264/258 |
| 282577 | 3/1971 | U.S.S.R. | 416/239 |
| 333249 | 8/1930 | United Kingdom | 416/239 |
| 831380 | 5/1958 | United Kingdom | 416/226 |
| 2218473 | 11/1989 | United Kingdom | 416/226 |

Primary Examiner—Edward K. Look
Assistant Examiner—James A. Larson
Attorney, Agent, or Firm—Antonelli, Terry, Stout & Kraus

[57] ABSTRACT

A turbine blade (1), for example, for a ram air turbine engine, and method of making the turbine blade, wherein the turbine blade (1) includes a blade retention insert member (2) having a hub connector (3). The turbine blade (1) is fabricated by using sheet molding compound consisting essentially of discontinuous short fibers (7) initially random spaced within a polymer matrix sheet. A plurality of sheets of sheet molding compound are precut to a desired configuration or shape and placed in a heated blade mold. Heat and pressure are applied to the mold causing the sheet molding compound to flow around the blade retention insert member (2) and fill the mold cavity. The flow of the sheet molding compound causes the initially randomly oriented short fibers (7) to preferentially align in the direction of flow to rigidify the turbine blade (1). Fiber woven cloth skins (8) may integrally molded with the sheet molding compound during the compression molding process to accommodate high loads, and an aluminum chopped strand veil cloth (9) may also be integrally molded into the blade (1) or layers of conductive material may be deposited on at least portions of the surface of the turbine blade (1) during a secondary operation. At least one woven cloth material (6) may also be integrally molded into the turbine blade (1) to react to bending loads and to provide additional load transfer capabilities.

36 Claims, 1 Drawing Sheet

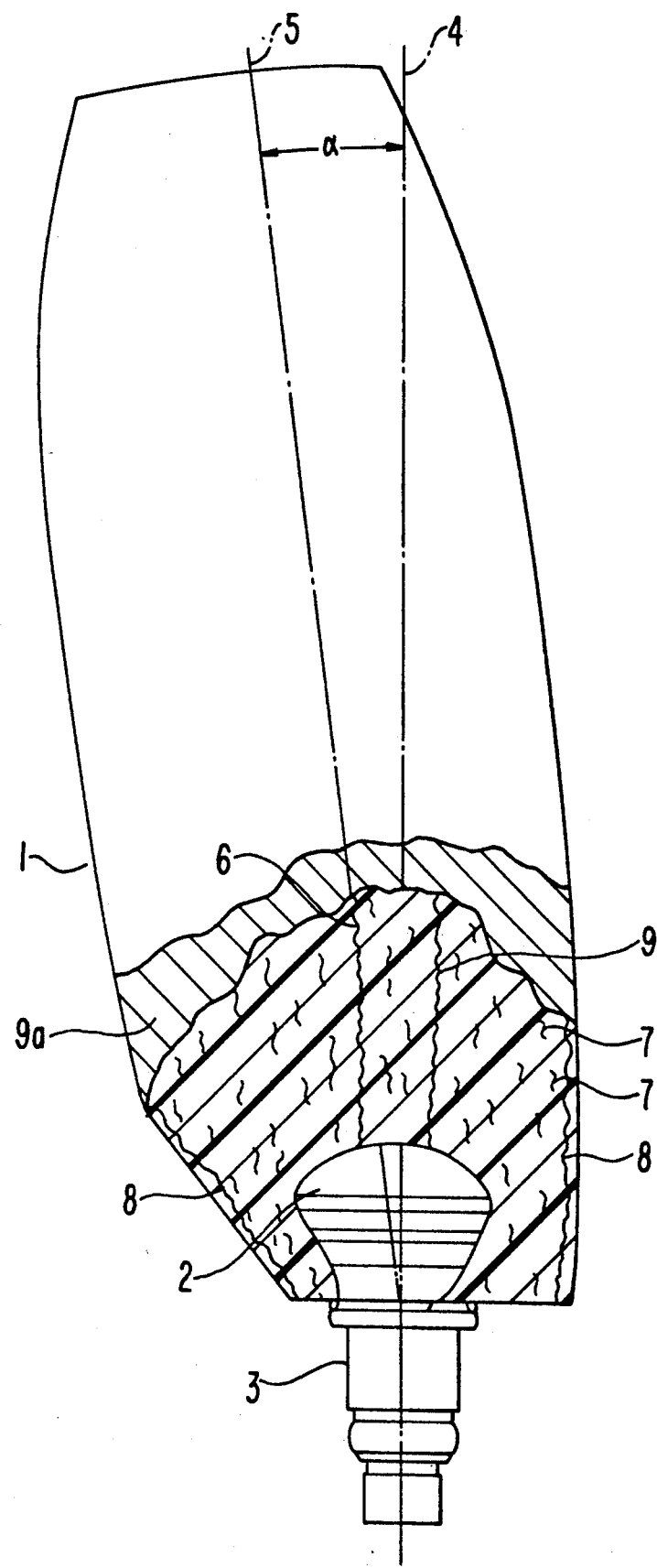

TURBINE BLADE WITH METALLIC ATTACHMENT AND METHOD OF MAKING THE SAME

This is a continuation of application Ser. No. 528,479 filed May 25, 1990, now abandoned.

TECHNICAL FIELD

The present invention relates to a turbine blade and method of making the same and, more particularly, to a turbine blade, for example, for a ram air turbine engine (RAT) with the turbine blade including a metallic attachment within a mass composite of material.

BACKGROUND ART

Hydraulic and electric power are generated in aircraft by power take-offs from propulsion engines during flight and/or an auxiliary power unit (APU). Control of an aircraft is dependent upon the generation of electrical and/or hydraulic power. In the event the propulsion engines are rendered inoperative during flight and emergency power cannot be generated by the APU, control of the aircraft may not be maintained without an emergency power source which generates its power from movement of the aircraft through the air.

For this purpose, ram air turbine engines (RATs) are used to generate emergency power in modern jet aircraft, with the RAT being stored within the fuselage or wing of an aircraft except during deployment for the purpose of generating emergency power. Upon deployment, the RAT pivots from a stowed position within the fuselage or wing to a deployed position which extends downwardly from the aircraft to a position where the air intercepts the turbine blades then turns producing power as a consequence of the velocity of the aircraft moving through the air.

An example of a typical RAT construction is disclosed in, for example, U.S. Pat. No. 3,125,960.

Turbine blades for RATs have been and are currently forged or machined from aluminum; however, to enhance the RAT's performance, there has been a demand for turbine blades having an increased axial length. While it initially may appear that an increase in length would not pose any particular problems, the increased axial length involves increase in weight as well as the imposition of higher loads on the hub of the RAT.

For example, if, following the past and current trend, aluminum blades are used for the RAT, it is necessary to completely redesign the RAT hub thereby increasing the weight as well as the mechanical complexity; however, a redesign is not required if the blades are constructed so as to have a mass moment of inertia equal to or at least substantially equal to existing shorter aluminum blades. In order to obtain the desired mass moment of inertia for the longer blades, it is necessary for the blades to be manufactured from a composite material while at the same time minimizing the manufacturing costs and providing a high reproducibility and enabling inspection of the finished turbine blades.

In, for example, U.S. Pat. No. 3,713,753, a laminate construction for an airfoil wing type member is proposed, with the member being produced by machine winding multiple layers of reinforcing fiber about a foil-like material support layer on a rotatable mandrel, with the laminate construction being cut from the mandrel and shaped to a desired configuration in a mold cavity with the addition of a hardenable resin filler material. Adjacent layers of the fibers are wound to form a diamond shaped pattern, with the pitch angles of the fibers in different layers being varied to accommodate different conditions.

U.S. Pat. No. 4,648,921, also proposes a blade construction including an outer shell of a fiber reinforced plastic which is bonded by way of a bonding adhesive to an aluminum spar extending substantially centrally therewith. The lightweight filler material such as a rigid urethane foam is formed within the voids remaining between the shell and the spar, with a protective metal sheath being subsequently fitted and bonded to the leading edge of the blade by an adhesive bond. The spar is provided with a root portion for facilitating interconnection of the blade to a hub.

Yet another composite blade construction is proposed in, for example, U.S. Pat. No. 4,022,547, wherein the blade is fabricated by laying up and bonding together a plurality of filament laminates, with the filaments of at least a portion of the laminates being skewed in a chordwise direction, forward and aft of a non-radial blade axis so as to form a biased lay-up with the blade center of twist biased forward or aft of the blade radial axis. The filaments may be skewed forward so that no filaments run from the blade leading edge to the blade tip but rather from the blade leading edge to the blade root.

U.S. Pat. No. 3,883,267, also proposes a blade construction made of composite fibrous material, with the blade construction comprising a streamlined or airfoil section arranged around a core. The airfoil section is constituted by a superimposition upon the core of a plurality of superimposed layers of composite fibrous material composed of, for example, a matrix of synthetic resin in which is incorporated a fibrous reinforcement having high grade mechanical characteristics and constituted by fibers or filaments of carbon or boron. The core is made of a metal such as titanium and includes a blade fixing root portion 3a constructed so as to be accommodated in a circumference of a disk or drum.

Yet another composite blade construction is proposed in U.S. Pat. No. 3,762,835, wherein the primary structure of the blade comprises elongated graphite fibers embedded in a polymeric resin matrix forming a filament/resin composite with filaments/resin sheets comprising partially cured polymeric resin having a plurality of graphite filaments embedded therein in a generally equi-spaced parallel relationship, arranged in an area of the blade so as to provide protection against damage caused by foreign objects.

While each of the above proposed blade constructions are somewhat effective in achieving their respective stated objectives, each propose the utilization of continuous fibers and a filament winding or laying process to arrive at the desired blade construction.

In, for example, U.S. Pat. No. 4,834,616, a rotor blade is provided which comprises a composite structure formed by laminating multiple plies or layers to provide high strength or high modulus of elasticity for the rotor blade, with the blade being fabricated with an inner core, a composite thickness of woven material about the core, an outer layer, and a single covering layer. The inner core may be fabricated of a closed cell foam, with the composite thickness being a woven composite, the outer layer being formed of a composite of graphite filaments and epoxy resin matrix, and the covering layer being formed of a single ply of glass filaments with an epoxy resin matrix. A socket of a metallic material is provided with a threaded connection for mounting on the rotor hub, with a retention member being positioned within the socket.

In DE 30 15 208 A1, proposes a plastic blade construction wherein each blade includes a metal core having a central spindle with anchoring profiles projecting therefrom. An outer case of plastic material is built-up around the core and profiled to a desired aerodynamic shape. The core includes a projecting member for enabling an attachment to the hub, and a fine metal wire mesh is embedded in an outer layer of the plastic material.

DISCLOSURE OF THE INVENTION

The aim underlying the present invention essentially resides in providing a turbine blade and method of manufacturing the same which enables an increase in an axial length of the blade without increasing the weight or load on the blade supporting hub, and with the total manufacturing cost of the blade being minimized.

In accordance with the present invention, a blade, for example, for a RAT is fabricated by utilization of a sheet molding compound having randomly positioned short fibers in a polymer mix.

To enable the accommodation of high loads on blade surfaces, fiber woven cloth skins may be integrally molded with the sheet molding compound during a compression molding. If lightning strike protection is required, an aluminum chopped strand veil may be integrally molded in the blade or thin layers of conductive materials may be deposited onto the blade surface as a secondary operation.

To provide for a reaction of bending loads and to enable an additional load transfer capability, an internal rib of uni-directional or woven cloth may be embedded in the blade.

During a manufacturing of the blade, the sheet molding compound, precut to a specified shape, is preheated and subsequently placed into the heated blade mold. Heat and pressure are applied to the mold causing the sheet molding compound to flow around the retention insert and to fill the mold cavity. The above described flow causes the initially randomly oriented short fibers to preferentially align in the direction of the flow.

The above and other objects, features, and advantages of the present invention will become more apparent from the following description when taken in connection with the accompanying drawing which shows, for the purpose of illustration only, one embodiment in accordance with the present invention.

BRIEF DESCRIPTION OF THE DRAWINGS

The Single Figure of the drawing is a schematic partially broken away view of a turbine blade with metallic attachment constructed in accordance with the present invention.

BEST MODE FOR CARRYING OUT THE INVENTION

Referring now to the Single Figure of the drawings, according to this figure, a blade for example, a blade for a RAT, is a composite structure integrally formed with a metallic blade retention insert member 2 integrally molded in the blade 1. The insert member 2 includes a hub connector 3, with the retention insert member and hub connector 3 being preferably manufactured from titanium in order to prevent galvanic corrosion from occurring during a life of the turbine blade which would tend to undermine the composite/insert bonded interface.

The blade 1 is fabricated by using a sheet molding compound which consists essentially of discontinuous short fibers randomly positioned within a polymer matrix sheet. The matrix sheet is generally about 0.1" in thickness and the fibers have a fiber length of between 0.25" and 2.0". The sheet molding compound is precut to a specific shape. The insert member 2 is configured such that, during a molding of the blade 1, the sheet molding compound flows easily about an outer surface thereof and, for example, the insert member 2 may be configured in a manner described more fully in commonly assigned U.S. application Ser. No. 528,477, entitled "Root Attachment For Composite Turbine Blade, Turbine Blade and Method of Making Turbine Blade" filed on even date herewith now U.S. Pat. No. 5,118,257.

To enable the surfaces of the blade to accommodate high loads, fiber woven cloth skins 8 can be integrally molded with the sheet molding compound during the compression molding process. Moreover, to account for a lightening strike, an aluminum chopped strand veil cloth 9 may also be integrally molded into the blade 1 or thin layers 9a of a conductive material may be deposited on the surface of the turbine blade 1 as a secondary operation.

Additionally, the blade 1 may be provided with an internal rib of uni-directional or the woven cloth material 6 may be integrally molded in the turbine blade 1 to react to bending loads and provide additional load transfer capabilities.

In the manufacturing of the blade 1, a thermoplastic or thermoset matrix can be used along with carbon, graphite, glass, steel, aramide or ceramic fibers.

In accordance with the method of the present invention, a plurality of sheets of sheet molding compound consisting essentially of chopped fiber material with short fiber lengths of, for example, between 0.2" to 2.0" randomly positioned on a matrix sheet of, for example, about 0.1" thickness are precut to a specified shape. The randomly positioned chopped fibers may, for example, be graphite filaments positioned in an epoxy resin. The precut sheets of molding compound are placed in a heated blade mold (not shown) on respective sides of the retention member 2 and the graphite-epoxy and retention member 2 are compression molded under a pressure of, for example, about 1,000 psi and a temperature of, for example, 300° F. for, for example twenty minutes. The heat and pressure applied to the mold cause the sheet molding compound to flow around the retention insert 2 and to fill the mold cavity. The flow of the molding compound causes the initially randomly oriented short fibers 7 to preferentially align in the direction of flow of the sheet molding compound so as to rigidify the turbine blade 1.

The retention member 2 is angled to extend along a center line 5 of the blade to prevent offset bending moments. As a result the retention insert member 2 forms an angle $\alpha$ with respect to a longitudinal center axis 4 of the hub connector. The retention insert member 2 is also twisted at a slight angle of, for example, approximately 2 degrees for this purpose. To prevent undue bending stress, the retention insert member 2 may be symmetric about a center line thereof with a body of the retention insert member 2 having a cross-sectional area maximized within constraints of the base of the turbine blade to account for maximum bending, torsional and centrifugal loads passing into the hub (not shown) by way of the hub connector 3. Preferably, a thickness of the composite material about the retention insert member 2 is no less than 0.100".

To prevent galvanic corrosion occurring during a lifetime of the turbine blade 1, which corrosion would tend to undermine the bonded interface between the composite material of the turbine blade and the retention insert member 2 so that the parallel failure path of bonding and mechanical lock would be lost, the retention insert member is preferably made of a titanium alloy. Alternatively, the stainless steel could be utilized; however, such alternative result in a heavier composite turbine blade 1. To obtain of a high strength adhesive bond between the retention insert member 2 and the composite material of the turbine blade the retention insert member 2 is preferably pretreated prior to bonding to enhance an adhesion of the composite material of the turbine blade 1 to the insert retention member 2. For this purpose, the titanium alloy insert retention member 2 may be subjected to an alkali etch and an application of a primer coat to improve adherence of the graphite epoxy material to the insert retention member 2. For example, an epoxy resin such as, for example, BR 127 of American Cyanimide may be applied and then cured for, for example about one-half hour at, for example, a temperature of 250° F., with the insert retention member 2 then being subjected to the above described compression molding operation so as to integrally mold the plurality of sheets of sheet molding compound and retention insert member 2 to form the composite turbine blade 1.

While we have shown and described only one embodiment in accordance with the present invention, it is understood that the same is not limited thereto but is susceptible to numerous changes and modifications as known to one of ordinary skill in the art, and we therefore do not wish to be limited to the details shown and described herein, but intend to cover all such modifications as are encompassed by the scope of the appended claims.

We claim:

1. A turbine blade comprising an elongated, molded blade of composite material consisting essentially of short fibers positioned in an epoxy resin, and a rotor retention member having an insert at a first end of said member and a hub securing end at a second opposite end of said member, said insert being integrally molded into said composite material of said molded blade at one end of said blade with said hub securing end of said member protruding from said one end of the blade for connecting the turbine blade to a hub of a turbine rotor, wherein short fibers of said composite material are aligned in parallel to each other in a longitudinal direction of said elongated blade as a result of flow of the composite material in said direction occurring during a molding of the molded blade, so as to rigidify the elongated turbine blade.

2. A turbine blade according to claim 1, wherein the composite material is formed by integrally molding a plurality of sheets of fiber material having initially random positioned fibers in the epoxy resin.

3. A turbine blade according to claim 2, wherein the short fibers have a length of between 0.25" to 2.0".

4. A turbine blade according to claim 3, wherein the rotor retention member is fashioned of a titanium alloy.

5. A turbine blade according to claim 2, wherein the fibers consist essentially of one of carbon, graphite, glass, steel, aramide or ceramic material.

6. A turbine blade according to claim 5 wherein the rotor retention member is fashioned of a titanium alloy.

7. A turbine blade according to claim 1, further comprising means the molded blade for reacting to bending loads and for providing additional load transfer capabilities.

8. A turbine blade according to claim 7, wherein said means for reacting includes at least one internal rib.

9. A turbine blade according to claim 7, wherein said means for reacting includes at least one woven cloth.

10. A turbine blade according to claim 7, further comprising at least one thin layer of conductive material on a surface of the molded blade for arresting lightning strikes.

11. A turbine blade according to claim 7, further comprising at least one aluminum chopped strand veil cloth in the composite material of the molded blade to arrest lightning strikes.

12. A turbine blade according to claim 7, wherein means are arranged at least at surface portions of the molded blade for accommodating increased loads.

13. A turbine blade according to claim 12, wherein said means for accommodating includes at least one fiber woven cloth skin in the composite material of the molded blade.

14. A turbine blade according to claim 1, wherein the insert is angled relative to the longitudinal axis of the hub securing end of the rotor retention member such that the insert extends along a central line of the molded blade of composite material.

15. A turbine blade according to claim 1, wherein said rotor retention member is formed of metal.

16. A method of manufacturing an elongated, composite turbine blade, the method comprising the steps of providing a rotor retention member having an insert at a first end of the member and a hub securing end at a second opposite end of the member for connecting the turbine blade to a hub of a turbine rotor, providing a plurality of sheets of molding compound consisting essentially of short randomly positioned fibers arranged in a polymer matrix, precutting the sheets of molding compound into a desired configuration, placing said sheets and said insert of the retention member in a molding cavity of a mold and integrally molding the plurality of sheets and retention member in the mold by applying heat and pressure to form a composite blade by causing the molding compound to flow about said insert end of said retention member and to fill the mold cavity such that said short randomly positioned fibers are aligned in parallel to each other in a longitudinal direction of said elongated blade as a result of flow of the molding compound in said direction occurring during the molding so as to rigidify the composite turbine blade.

17. A method according to claim 16, wherein the step of integrally molding includes placing the plurality of sheets about the rotor retention member, heating the sheets to a predetermined temperature under an application of a predetermined pressure for a predetermined period of time to form the blade with the rotor retention member integrally molded therewith.

18. A method according to claim 17, wherein the predetermined temperature is 300° F.

19. A method according to claim 18, wherein the predetermined pressure is 1,000 psi.

20. A method according to claim 19, wherein the predetermined period of time is about twenty minutes.

21. A method according to claim 20 wherein the fibers have a length of between 0.25" to 2.00".

22. A method according to claim 21, wherein the fibers consist essentially of one of carbon, graphite, glass, steel, aramide or ceramic material.

23. A method according to claim 22, further comprising the step of pretreating the rotor retention member to enhance a bonding between the rotor retention member and the sheet molding compound.

24. A method according to claim 23, wherein the step of pretreating includes subjecting at least the insert end of the rotor retention member to an alkali etch and applying a primer coat to at least the insert end of the rotor retention member.

25. A method according to claim 24, wherein the primer is an epoxy resin, and wherein the step of pretreating further includes curing the epoxy resin for a predetermined curing time at a predetermined curing temperature.

26. A method according to claim 25, wherein the predetermined curing temperature is about 250° F.

27. A method according to claim 25, wherein the predetermined curing time is about thirty minutes.

28. A method according to claim 16, wherein the fibers consist essentially of one of carbon, graphite, glass, steel, aramide or ceramic material.

29. A method according to claim 28, further comprising the step of pretreating the rotor retention member to enhance a bonding between the rotor retention member and the sheet molding compound.

30. A method according to claim 29, wherein the step of pretreating includes subjecting at least the insert end of the rotor retention member to an alkali etch and applying a primer coat to at least the insert end of the rotor retention member.

31. A method according to claim 16, wherein the primer is an epoxy resin, and wherein the step of pretreating further includes curing the epoxy resin for a predetermined curing time at a predetermined curing temperature.

32. A method according to claim 30 further comprising the steps of providing at least one fiber woven cloth skin for accommodating high loads at least at surface portions of the blade, and integrally molding said at least one fiber woven cloth skin into the turbine blade during the step of integrally molding.

33. A method according to claim 16, further comprising the step of providing at least one woven cloth material for reacting to bending loads of the blade, and integrally molding the at least one woven cloth material into the blade during the step of integrally molding.

34. A method according to claim 16, further comprising the step of depositing at least one thin layer of conductive material on at least a portion of an outer surface of the blade for arresting lightning strikes.

35. A method according to claim 16, further comprising providing at least one aluminum chopped strand veil cloth for arresting lightning strikes, and integrally molding the at least one aluminum chopped strand veil cloth during the step of integrally molding.

36. A method according to claim 16, wherein said insert is angled relative to the longitudinal axis of the hub securing end of the rotor retention member and said insert is molded in the composite blade with the insert extending along a central line of the blade.

* * * * *